April 21, 1936.                    E. S. COOK ET AL                    2,038,148
                              ANTI-WHEEL SLIDING DEVICE
                                 Filed July 31, 1934
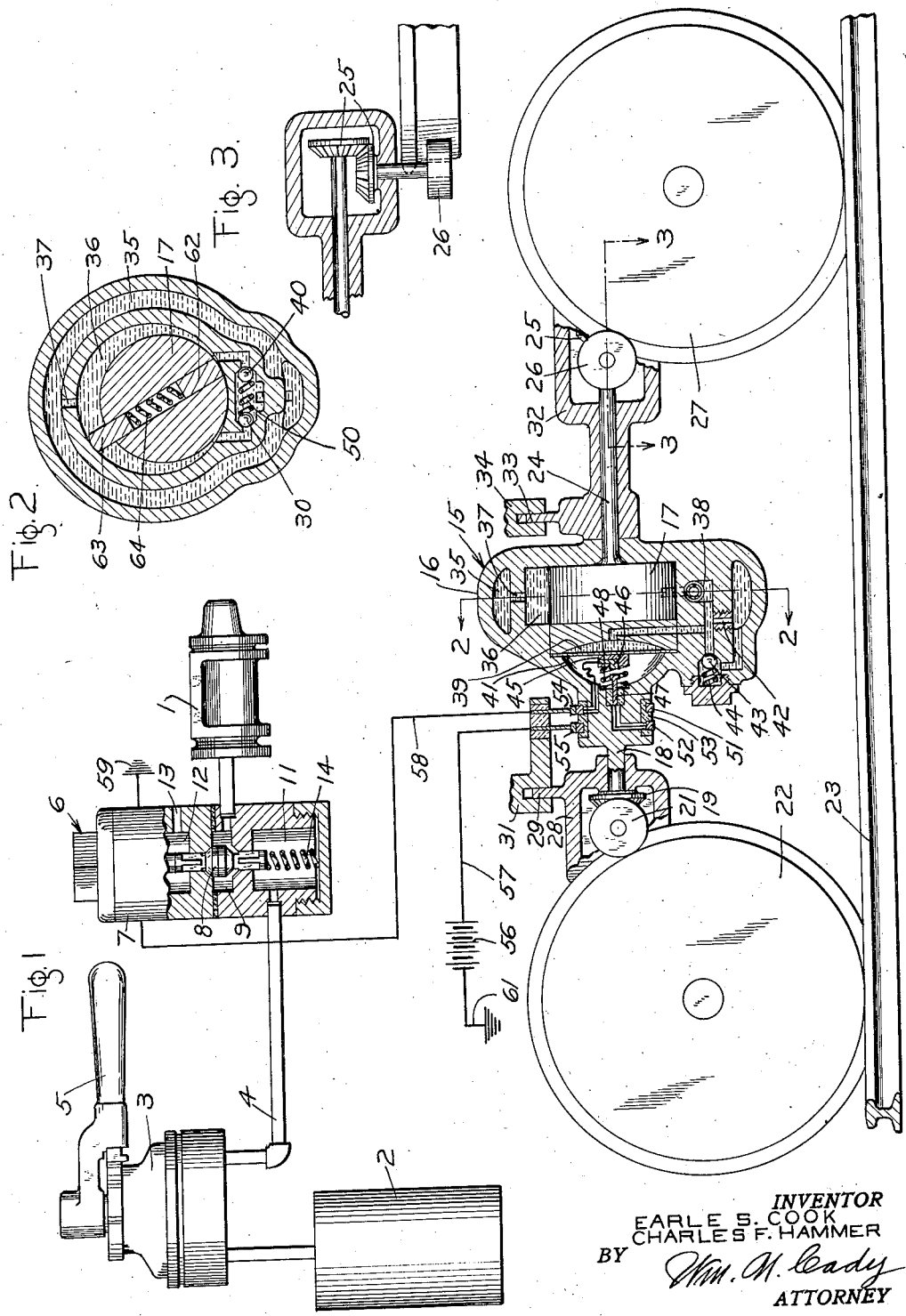
INVENTOR
EARLE S. COOK
CHARLES F. HAMMER
BY
ATTORNEY Patented Apr. 21, 1936

2,038,148

UNITED STATES PATENT OFFICE 2,038,148

ANTI-WHEEL SLIDING DEVICE

Earle S. Cook, Wilkinsburg, and Charles F. Hammer, Greensburg, Pa., assignors to The Westinghouse Air Brake Company, Wilmerding, Pa., a corporation of Pennsylvania Application July 31, 1934, Serial No. 737,708

6 Claims. (Cl. 303—21)

Our invention relates to brake equipment for vehicles, and more particularly to means for reducing the degree of application of the brakes when required to prevent the wheels from sliding on the rails.

It is well known that for a given braking pressure, friction type brakes are less effective in retarding the motion of a vehicle at high speeds than at low speeds because the coefficient of friction between the rubbing parts is lower at high speeds than at low speeds. In order to bring a vehicle to a stop quickly it has been the usual practice for an operator to apply the brakes with a high degree of braking pressure at the high speeds, and, as the speed of the vehicle decreases, to so operate the brakes as to cause the braking pressure to decrease in such manner that the vehicle is brought to a stop quickly and smoothly without dangerous shock or sliding of the wheels.

When railway trains and traction vehicles are operated at very high speeds, a correspondingly high braking force must be employed to bring the train or vehicle to a stop in a reasonable length of time. When such braking forces are applied, the problem of properly reducing the braking forces by manual operation of the brake mechanism, as the vehicle slows down, becomes difficult and there is considerable danger of the wheels sliding on the rails. It is therefore desirable to provide means for automatically detecting and relieving the sliding of the wheels on the rails as a part of the braking equipment on high speed trains and vehicles.

It is desirable that the braking force be reduced as soon as the wheel starts to slip, or while it is rotating at a speed only slightly below its free rolling speed. By reducing the braking force during the incipient stage of wheel sliding, a much less reduction in the braking force applied to the brake shoes is required to again permit free rolling of the wheel on the rails, and the average effective braking force is maintained at a higher value.

It is an object of our invention to provide for protecting vehicle wheels against sliding on the rails when the braking force on the wheels only slightly exceeds the force of adhesion of the wheels to the rails, that is, upon a slight reduction in the speed of the wheel from its free rolling or train speed.

It is another object of our invention to provide means for protecting car wheels from sliding on the rails that will remain effective until the wheels again rotate at a speed corresponding to the speed of the car or vehicle, and that will then permit an increase in the braking force.

It is another object of our invention to provide means of the above indicated character that is operative in either direction of travel of the vehicle without the necessity of providing direction reversing mechanism.

Other advantages and objects of our invention will appear from the following description of one embodiment thereof taken in connection with the accompanying drawing, in which Fig. 1 is a diagrammatic view of circuits and apparatus illustrating one preferred embodiment of the invention, Fig. 2 is a sectional view taken along the line 2—2 in Fig. 1, and Fig. 3 is a sectional view taken along the line 3—3 in Fig. 1.

Referring to the drawing, and more particularly to Fig. 1 thereof, the numeral 1 indicates the brake cylinder of a fluid pressure brake that is supplied with fluid under pressure from the reservoir 2 through the brake valve device 3 and a brake cylinder pipe 4, and from which fluid under pressure is released through the brake cylinder pipe 4 and the brake valve device 3, in accordance with the operation of the brake valve handle 5 in a well known manner.

A magnet valve device 6 is connected in the brake cylinder pipe 4 for controlling communication between the brake valve device 3 and the brake cylinder 1, and between the brake cylinder 1 and the atmosphere. The magnet valve device 6 comprises a magnet 7 operatively connected to a double beat valve 8 that is effective to control communication between the valve chamber 9 and the inlet chamber 11, and also between the valve chamber 9 and the atmosphere through outlet chamber 12 and exhaust port 13. A spring 14 is provided in the inlet chamber 11 for biasing the valve 8 to its upper seated position to close communication between the valve chamber 9 and the atmosphere, and to effect communication between the brake valve device 3 and the brake cylinder 1.

A differential device, in the form of a rotary vane pump 15, is provided having an outer rotary casing portion 16 and a central rotary member 17. The casing portion 16 is adapted to be rotated through operation of a shaft 18, gear wheels 19 and a roller 21 that engages the surface of one of the car wheels 22 that roll along on the rail 23. The rotary member 17 is operated in accordance with the speed of rotation of the car wheel 27, through operation of a connecting shaft 24, gear wheels 25, and roller 26 that engages the periphery of the car wheel 27. A gear box or housing 28 is provided about the bevel gear wheels 19, and may be held against rotation by an upwardly extending portion 29 engaging a bore in the car frame 31. A gear housing and bearing member 32 is also provided about the gear wheels 25 and the shaft 24 and may be held against rotation by an upwardly extending portion 33 engaging a bore in a portion of the car frame 34.

The casing portion 16 of the rotary pump comprises an outer circumferential chamber 35 surrounding an inner chamber 36 containing the rotary member 17 and connected to the outer chamber 35 at one point by a port 37. An outlet passage 38 leads from the inner chamber 36 on opposite sides of the rotary member 17, past the ball check valves 30 and 40 that are urged to their associated valve seats by a spring 50, to a chamber 39 in the rear of a movable diaphragm 41 for a purpose to be later explained. The passage 38 is in constant communication with the annular chamber 35 through a restricted port 42, and, upon a sufficient increase in pressure within the passage 38, also past a check valve 43 that is normally held in its seated position by a spring 44 to close communication between the passage 38 and the annular chamber 35. The diaphragm 41 carries on its front face an insulating supporting member 45 that carries a contact member 46 that is adapted to engage a contact member 47, but is normally held out of engagement therewith by a spring 48 that is positioned between and engages the supporting member 45 and one wall of the casing.

The contact members 46 and 47 are respectively connected to collector rings 51 and 52 that are mounted in an insulating sleeve bushing 53 about a portion of the casing 16, and that engages brushes 54 and 55, respectively. Upon engagement of the contact members 46 and 47 a circuit is completed from a source of electrical energy, such as the battery 56, through conductor 57, brush 55, collector ring 52, the contact member 47, contact member 46, collector ring 51, brush 54, conductor 58, the winding of the magnet 7, to ground at 59, and to the grounded terminal 61 of the battery 56. A transverse slot is provided diametrically across the rotor member 17 in which are positioned vanes 62 and 63, the inner ends of which are engaged by the opposite end of a spring 64 that urges the vanes 62 and 63 apart against the peripheral wall of the chamber 36.

While the car wheels 22 and 27 are freely rotating at train speed the inner rotary member 17 and the outer rotary casing 16 of the pump 15 will be operating in the same direction and at the same speed so that there will be no relative movement between the elements 16 and 17.

If the operator moves the handle 5 to effect the supply of fluid under pressure from the reservoir 2 to the brake cylinder 1 to apply the brakes, and if the degree of application of the brakes becomes sufficient to cause one of the wheels to slip on the rails, for example the wheel 22, the casing 16 will revolve at a lesser rate of speed than the rotor 17, thus effecting a rotating movement of the rotor 17 and the vanes 62 and 63 within the chamber 36, causing the rotary pump to force fluid from the chamber 35 through port 37 to chamber 36 and past one of the check valves 30 or 40, through outlet port 38 to the chamber 39 in the rear of the diaphragm 41 forcing the diaphragm towards the left and causing engagement of contact member 46 with the contact member 47. Upon engagement of the contact members 46 and 47 the winding of the magnet 7 will be energized through the above traced circuit causing the valve 8 to be moved downwardly to close commmunication between the inlet chamber 11 and the brake cylinder 1, and to open communication from the brake cylinder 1 to the atmosphere through outlet chamber 12 and exhaust port 13, thus reducing the degree of application of the brakes. The reduction in the degree of application of the brakes will continue until the braking force on the wheel 22 is sufficiently reduced to permit the wheel to again freely roll at train speed on the rail 23, at which time the relative movement between the elements 16 and 17 of the rotary pump will cease and the pressure within the chamber 39 and the passage 38 will be reduced to the pressure within the annular chamber 35 by the flow of fluid through the restricted port 42, thus reducing the pressure behind the movable diaphragm 41 and permitting the spring 48 to move the diaphragm toward the right and carry the contact member 46 out of engagement with the contact member 47 and interrupt the energization of the magnet 7. Upon deenergization of the magnet 7 the valve 8 is forced upwardly by the spring 14, closing communication between the brake cylinder 1 and the atmosphere and opening communication between the inlet chamber 11 and the brake cylinder 1, thus permitting the supply of fluid under pressure to, or the release of fluid under pressure from, the brake cylinder 1 in accordance with the operation of the handle 5 of the brake valve device 3. If an application of the brakes causes the car wheel 27 to slip before the car wheel 22 slips, the member 17 will rotate within the chamber 36 in a direction opposite to that resulting from the slipping of the wheel 22, and will effect a similar forcing of fluid from the chamber 36, past the other of the check valves 30 or 40, through the passage 38 to the chamber 39 in the rear of the diaphragm 41, to effect a similar operation of the contact member 46 and of the magnet valve device 6 to reduce the degree of application of the brakes. Should the relative movement of the rotary valve elements 16 and 17 become considerable, the pressure within the passage 38 may become sufficient to force the ball check valve 43 from its seat against the pressure of the spring 44, thus permitting fluid to pass from the passage 38 past the check valve to the annular chamber 35 to prevent excessive pressure on the diaphragm 41. The differential device may be so designed that a relatively small difference in the speeds of its differentially related parts, corresponding to, say two miles per hour below its free rolling speed, will effect a reduction in brake cylinder pressure.

While our invention has been illustrated and described as applied to two pairs of car wheels it will be apparent that it may be applied to any number of car wheels to which the brakes are applied. While it has been assumed for the purpose of the above description that braking pressure is applied jointly to the car wheels 22 and 27, it will be apparent that one element of the differential pump device 15 may be operated through a wheel to which the brakes are not applied and which will at all times freely roll at train speed independently of the degree of application of the brakes.

While we have illustrated and described one preferred embodiment of our invention, it will be apparent to those skilled in the art that many changes in the circuits and apparatus described may be made within the spirit of our invention and we do not wish to be limited otherwise than by the scope of the appended claims.

Having now described our invention, what we claim as new and desire to secure by Letters Patent, is:

1. In a brake equipment for vehicles, in combination, a brake cylinder, means for supplying fluid under pressure to said brake cylinder to apply the brakes, electroresponsive means for releasing fluid under pressure from said brake cylinder, control means for said electroresponsive means including a fixed contact member and a movable contact member, and hydraulic means differentially responsive to the speeds of two track wheels for actuating the movable contact member into and out of engagement with said fixed contact member.

2. In a brake equipment for vehicles, in combination, a brake cylinder, means for supplying fluid under pressure to said brake cylinder to apply the brakes, electroresponsive means for releasing fluide from said brake cylinder, control means for said electroresponsive means including a pair of cooperating contact members, and fluid pressure responsive means operative in accordance with a variation in the rotating speeds of a plurality of car wheels for operating said contact members.

3. In a brake equipment for vehicles, in combination, a brake cylinder, means for supplying fluid under pressure to said brake cylinder to apply the brakes, automatic means for releasing fluid under pressure from said brake cylinder, control means for said automatic means including a fluid pressure responsive means, and means differentially responsive to the speeds of a plurality of car wheels for operating said pressure responsive means.

4. In a brake equipment for vehicles, in combination, braking means, manually operable means for controlling the application and release of the brakes, automatic means for releasing the degree of application of the brakes independently of said manually operable means, and control means therefor comprising fluid pressure responsive means differentially responsive to the speeds of separate car wheels.

5. In a brake equipment for vehicles, in combination, braking means, manually operable means for controlling the application and release of the brakes, electrically operable means for reducing the degree of application of the brakes independently of said manually operable means, and control means for said electrically operable means comprising fluid pressure responsive means differentially responsive to the speeds of separate car wheels.

6. In a brake equipment for vehicles, in combination, a brake cylinder, means for supplying fluid under pressure to said brake cylinder to apply the brakes, electroresponsive means for releasing fluid from said brake cylinder, control means for said electroresponsive means including a pair of cooperating contact members, and fluid pressure responsive means operative upon rotation of one wheel at a different rate than another wheel.

EARLE S. COOK.
CHARLES F. HAMMER.